(12) United States Patent
Loh

(10) Patent No.: US 11,494,300 B2
(45) Date of Patent: Nov. 8, 2022

(54) PAGE TABLE WALKER WITH PAGE TABLE ENTRY (PTE) PHYSICAL ADDRESS PREDICTION

(71) Applicant: Advanced Micro Devices, Inc., Santa Clara, CA (US)

(72) Inventor: Gabriel H. Loh, Bellevue, WA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 17/033,737

(22) Filed: Sep. 26, 2020

(65) Prior Publication Data

US 2022/0100653 A1 Mar. 31, 2022

(51) Int. Cl.
*G06F 12/02* (2006.01)
*G06F 12/0802* (2016.01)

(52) U.S. Cl.
CPC ...... *G06F 12/0292* (2013.01); *G06F 12/0802* (2013.01); *G06F 2212/1021* (2013.01); *G06F 2212/602* (2013.01); *G06F 2212/684* (2013.01)

(58) Field of Classification Search
CPC ............ G06F 12/0802; G06F 12/0292; G06F 2212/684; G06F 2212/1021; G06F 2212/602
USPC ............................................................. 711/3
See application file for complete search history.

(56) References Cited

U.S. PATENT DOCUMENTS

| 2006/0004996 | A1* | 1/2006 | Gonion | G06F 8/441 712/241 |
| 2017/0161194 | A1* | 6/2017 | Loh | G06F 12/1054 |
| 2018/0307608 | A1* | 10/2018 | Di | G06F 12/0862 |
| 2018/0336141 | A1* | 11/2018 | Desai | G06F 12/1054 |

OTHER PUBLICATIONS

Margaritov, Artemiy et al.; Prefetched Address Translation; MICRO-52; Oct. 2019.
Barr, Thomas W. et al.; SpecTLB: A Mechanism for Speculative Address Translation; ISCA'11; Jun. 2011.
Pham, Binh et al.; CoLT: Coalesced Large-Reach TLBs; 2012 45th Annual IEEE/ACM International Symposium on Microarchitecture; 2012.

\* cited by examiner

*Primary Examiner* — Hua J Song

(57) ABSTRACT

Methods and apparatus provide virtual to physical address translations and a hardware page table walker with region based page table prefetch operation that produces virtual memory region tracking information that includes at least: data representing a virtual base address of a virtual memory region and a physical address of a first page table entry (PTE) corresponding to a virtual page within the virtual memory region. The hardware page table walker, in response to the TLB miss indication, prefetches a physical address of a second page table entry, that provides a final physical address for the missed TLB entry, using the virtual memory region tracking information. In some implementations, the prefetching of the physical PTE address is done in parallel with earlier levels of a page walk operations.

20 Claims, 6 Drawing Sheets

PAGE TABLE WALKER WITH PAGE TABLE ENTRY (PTE) PHYSICAL ADDRESS PREDICTION

BACKGROUND OF THE DISCLOSURE

Computing devices, such as central processing units (CPUs), graphics processing units (GPUs) other devices that use virtual addressing schemes, typically include translation lookaside buffers (TLBs) that allow for the retrieval of recent virtual memory address to physical memory address translations (e.g., virtual system page to physical system page translations). Such translations are necessary when, for example, executing programs reference a virtual memory address which then has to be translated to a physical memory address. A virtual memory address may reside, for example, in a guest physical page (GPP), while a physical memory address may reside, for example, in a system physical page (SPP). Typically, the TLB is in the form of a memory cache that stores recent translations to allow for a quicker retrieval of such a translation. When a virtual memory address to a physical memory address is referenced, the TLB is searched to see if the translation, in the form of a TLB entry, is available. If it is not available in the TLB, known in the art as a "TLB miss," system page table entries (PTEs) in physical memory are searched with what is known in the art as a memory page-table walk (e.g., memory page crawl). This operation is performed by a hardware page table walker. In addition, the translation may be stored in the TLB for future reference. If, however, the translation is available in the TLB, known in the art as a "TLB hit," the physical address is provided without having to search the physical memory. Thus, the translation is achieved much faster, as the memory page-table walk operation is avoided.

TLB performance is critical in many situations, especially as memory sizes continue to increase while memory page sizes remain at 4 KB pages or other size. The page-table walks consist of multiple sequentially dependent memory accesses. For example, with a 4-level tree page table walk, the first levels of the walk can typically be cached well by "Page Walk Caches" (PWC). However, the last level of the walk (for the final page table entry or PTE) is typically not cached in the PWC and often results in a data cache miss.

TLB miss penalties can be highly detrimental to performance, especially for Big Data workloads with irregular memory access patterns. For such workloads, faster CPU cores and/or higher memory bandwidth may not help much, and therefore solutions that can directly address the TLB miss penalty can be of significant value for such critical workloads. Performance may become even slower with the transition to higher level page tables. Reducing TLB misses directly improves performance (i.e., no delays waiting for translations from memory page-table walks) and reduces energy consumption (i.e., no energy spent on memory page-table walks).

BRIEF DESCRIPTION OF THE DRAWINGS

The implementations will be more readily understood in view of the following description when accompanied by the below figures, wherein like reference numerals represent like elements, and wherein.

Figure 1:
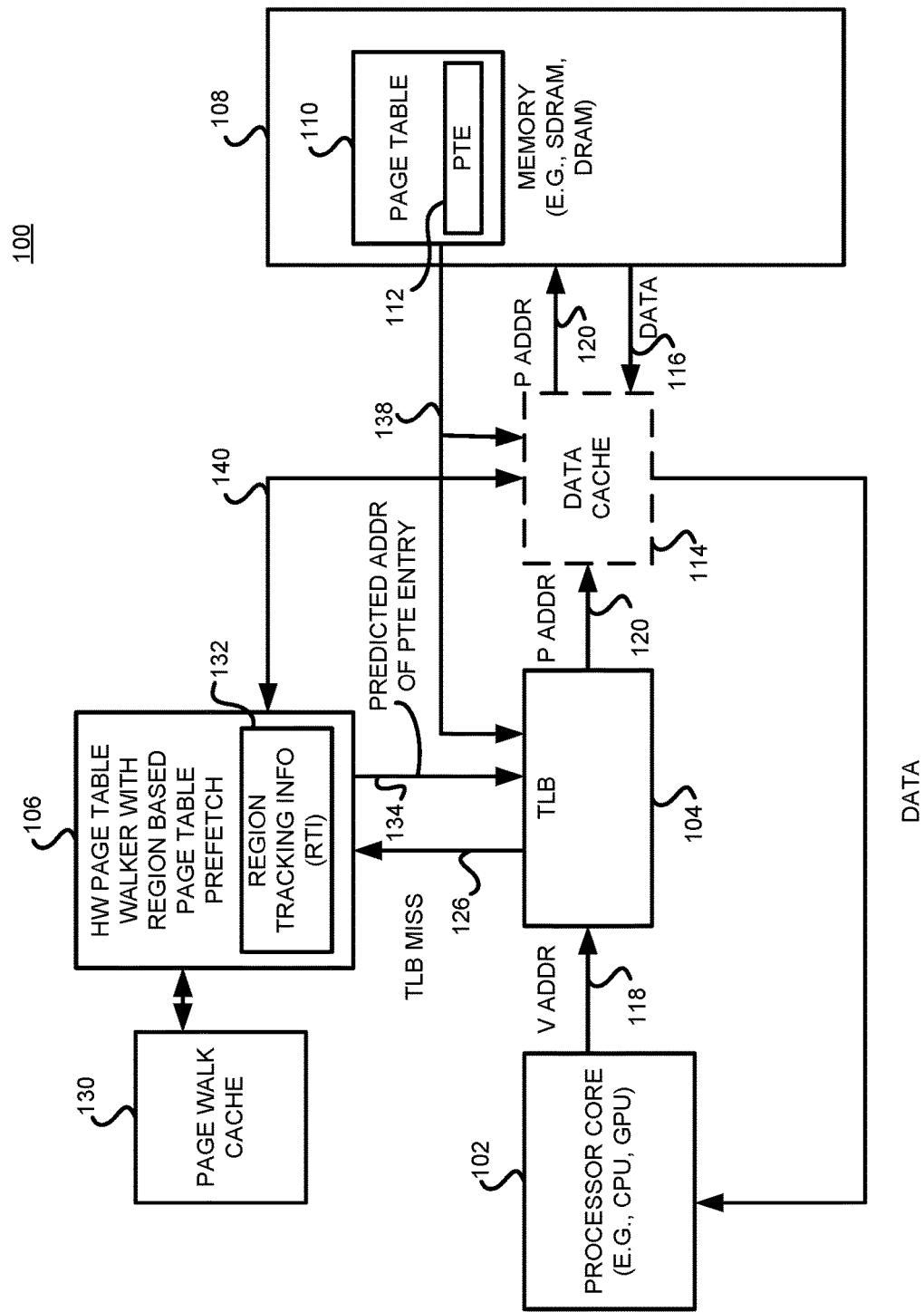
FIG. 1 is a block diagram illustrating a computing device for providing virtual to physical address translation in accordance with one example set forth in the disclosure.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF IMPLEMENTATIONS

Methods and apparatus leverage a common (although not required/guaranteed) spatial locality of PTEs to predict and prefetch the PTE address that provides the final physical address, thereby breaking the page table walk's serial/sequential walk procedure into one with parallel operations and reduces the page walk latency/penalty.

In certain implementations, a hardware page table walker produces virtual memory region tracking information that includes at least: data representing a virtual base address of a virtual memory region and a physical address of a first page table entry (PTE) corresponding to a virtual page within the virtual memory region; and prefetches a physical address of a second page table entry (PTE), that provides a final physical address for the missed TLB entry, using the virtual memory region tracking information.

In some implementations, an apparatus for providing virtual to physical address translation includes hardware page table walker that tracks prior page walk accesses of at least one virtual memory region the virtual memory region comprised of a plurality of virtual pages of memory; and predicts a physical address of a page table entry (PTE) as a last level look up in a page walk operation.

In certain implementations, an apparatus for providing virtual to physical address translation includes hardware page table walker that predicts a physical address of a page table entry (PTE) as a last level look up in a page walk operation; and prefetches the physical address of the (PTE), wherein the prefetched physical address provides a final physical address for a missed TLB entry.

In some implementations, an apparatus provides virtual to physical address translations and includes a translation lookaside buffer (TLB) that produces a TLB miss indication, and a hardware page table walker with region based page table prefetch operation that produces virtual memory region tracking information that includes at least: data representing a virtual base address of a virtual memory region and a physical address of a first page table entry (PTE) corresponding to a virtual page within the virtual memory region. The hardware page table walker, in response to the TLB miss indication, prefetches a physical address of a second page table entry, that provides a final physical address for the missed TLB entry, using the virtual memory region tracking information. In some implementations, the prefetching of the physical PTE address is done in parallel with earlier levels of a page walk operations.

In certain implementations the page table walker produces the virtual memory region tracking information by generating a region tracking table (RTT) that includes entries on a per virtual memory region basis wherein each entry includes data representing at least: the virtual base address of the virtual memory region, the physical address of the first page table entry (PTE) corresponding to a virtual page within the virtual memory region and a plurality of virtual memory region state bits per memory region.

In some implementations, the hardware page walker controls the plurality of virtual memory region state bits to indicate at least one of the following states: (a) that the virtual pages within the virtual memory region do not follow a desired physical memory address pattern; (b) that the virtual pages within the virtual memory region do follow a desired physical memory address pattern; (c) whether to use the virtual memory region in subsequent page table walks to predict the physical PTE addresses of virtual pages; and (d) a number of times that a desired physical memory address pattern for the virtual pages in a given virtual memory region has been detected.

In certain implementations, the hardware page walker determines whether the prefetch was based on a misprediction of the physical address of the PTE. In some examples the determination is done through a verification process. For example, by completing a sequential walking of the levels and comparing the resulting PTE physical address with the prefetched physical PTE address and if a match is found, then the prefetched translation was correct.

In some examples, the hardware page walker prefetches the physical address of the second PTE by determining a predicted physical address of the second PTE using the PTE base address from an entry of a matching virtual memory region, by using a virtual page table offset of aligned virtual pages in the virtual memory region and by using a size of a virtual page table.

In certain implementations, the hardware logic includes PTE address pattern determination logic that determines that virtual pages within the virtual memory region do not follow a desired physical memory address pattern. In some implementations, the page table walker provides the prefetched physical address of the second page table entry to at least one of the TLB or a data cache.

In certain implementations, the hardware page table walker performs the parallel prefetch of the physical address of the second page table entry that provides the final physical address that caused the TLB miss as a last level in a page walk operation based on the virtual memory region tracking information. In some implementations, the apparatus includes at least one processing core that request data using one or more virtual addresses and includes memory that stores page tables that include the page table entries.

In some examples, an apparatus provides virtual to physical address translations and includes a translation lookaside buffer (TLB) that produces a TLB miss indication and a hardware page table walker that tracks prior page walk accesses of at least one virtual memory region wherein the virtual memory region, such as a 2 MB region, is made up of a plurality of virtual pages of memory, such as 4 KB virtual pages. The hardware page table walker performs a prediction and prefetch of a physical address of a page table entry (PTE) as a last level look up in a page walk operation in parallel with earlier page table walk operations. The parallel prediction and prefetch of the physical address of the PTE is based on the tracked prior page walk accesses of the at least one virtual memory region.

In some implementations, the hardware page table walker tracks prior page walk accesses of the at least one virtual memory region by producing virtual memory region tracking information by generating the region tracking table (RTT). In certain implementations, the hardware page walker controls the plurality of virtual memory region state bits to indicate at least one of the following states: (a) that the virtual pages within the virtual memory region do not follow a desired physical memory address pattern; (b) that the virtual pages within the virtual memory region do follow a desired physical memory address pattern; (c) whether to use the virtual memory region in subsequent page table walks to predict the physical PTE addresses of virtual pages; and (d) a number of times that a desired physical memory address pattern for the virtual pages in a given virtual memory region has been detected.

In some examples, a method, carried out by a computing device, includes performing virtual address to physical address translation by producing a translation lookaside buffer (TLB) miss indication, producing, by a hardware page table walker, virtual memory region tracking information that includes at least: data representing a virtual base address of a virtual memory region and a physical address of a first page table entry (PTE) corresponding to a virtual page within the virtual memory region, and prefetching, by the hardware page table walker, a physical address of a second page table entry (PTE), that provides a final physical address for the missed TLB entry, using the virtual memory region tracking information.

In certain examples, the method includes producing, by the hardware page table walker, the virtual memory region tracking information by generating a region tracking table (RTT) comprising entries on a per virtual memory region basis wherein each entry comprises data representing at least: the virtual base address of the virtual memory region, the physical address of the first page table entry (PTE) corresponding to a virtual page within the virtual memory region, and a plurality of virtual memory region state bits per memory region.

In some examples, the method includes controlling the plurality of virtual memory region state bits to indicate at least one of the following states: that the virtual pages within the virtual memory region do not follow a desired physical memory address pattern, that the virtual pages within the virtual memory region do follow a desired physical memory address pattern, whether to use the virtual memory region in subsequent page table walks to predict the physical PTE addresses of virtual pages, and a number of times that a desired physical memory address pattern for the virtual pages in a given virtual memory region has been detected.

In certain examples, the method includes determining whether the prefetch was based on a misprediction of the physical address of the PTE. In one example this is done by completing a sequential walking of the levels and comparing the resulting PTE physical address with the prefetched physical PTE address and if a match is found then the prefetched address was correct.

In some examples, the prefetching of the physical address of the second PTE includes determining a predicted physical address of the second PTE using the PTE base address from an entry of a matching virtual memory region, using a virtual page table offset of aligned virtual pages in the virtual memory region and using a size of a virtual page table.

In certain examples, the method includes determining that virtual pages within the virtual memory region do not follow a desired physical memory address pattern. In some examples the method includes providing the prefetched physical address of the second page table entry to at least one of the TLB or a data cache. In other examples, the method includes performing the prefetch of the physical address of the second page table entry in parallel with previous page walk operations of a multi-level page walk operation.

FIG. 1 illustrates one example of a computing device 100 that utilizes virtual address to physical address mapping and in this example, includes one or more processor cores 102, such as a central processing unit core, graphics processing unit core, or any other compute unit that employs virtual addresses to access physical memory addresses in memory. The computing device 100 includes a translation lookaside buffer 104 and a hardware page table walker 106 with region based page table prefetch. The computing device 100 in one example includes memory 108, such as main memory or any other suitable memory that stores page tables 110 that each include corresponding page table entries 112. In some examples, the computing device 100 employs a data cache 114 to store data 116 that is stored in memory 108 and provided to the processor core 102 in response to a virtual address request 118. In some examples, the data cache 114 utilizes a translated final physical address 120 to obtain the data 116 from the memory 108.

The translation lookaside buffer 104 operates in a conventional manner to issue a TLB miss 126 when a desired virtual address translation is not provided in the TLB, in response to the TLB checking to see if the virtual address 118 has a translated physical address in the TLB. The TLB miss 126 is issued to the hardware page table walker 106 which attempts to locate the appropriate virtual to physical address mapping. The hardware page table walker 106 provides the translated physical address to the data cache 114, which then performs its own cache lookup (it is possible the data corresponding to the translated physical address is already cached) and access of memory in the case of a data cache miss.

In some examples, the hardware page table walker 106 uses a page walk cache 130 (PWC) to cache previously accessed address information from previous page walks as known in the art. In some examples, the hardware page table walker 106 produces virtual memory region tracking information 132 on a per-virtual memory region basis. The virtual region tracking information 132 in some implementations is used to predict and prefetch a physical address of a page table entry that provides a final physical address for the missed TLB entry.

While in the general case, any 4 KB virtual page can be mapped to any 4 KB physical page, it has been shown in practice that the mappings often occur in a clustered pattern where a number of consecutive virtual pages are mapped to consecutive physical pages, often with the same alignment with respect to, for example, 2 MB region boundaries. It has been discovered that the same "clustered" behavior can also manifest in the location of the page table entries (PTEs). That is, the PTEs that contain the mappings for, for example, all 4K pages in a 2 MB region are themselves all located in sequentially consecutive memory regions. In some implementations, the disclosed hardware page table walker leverages this discovered "clustering" of PTEs in physical memory to enable effective prediction of the address of a PTE entry 134. This prediction is then used to prefetch the predicted PTE entry 134 into the processor's cache hierarchy and/or TLBs.

The predicted physical address of the page table entry 134, in some examples, is provided to the hardware page table walker 106 which in some examples uses the predicted physical address of the page table entry 134 to lookup the PTE 112 in page table 110 to obtain the final physical address 138 for the virtual address 118. In some examples, the data for the final physical address is stored in the data cache 113 for later fast access by the processor core 102.

The computing device 100 may be any suitable computing device including, but not limited to, integrated circuit system on-chip (SOC) multi-core CPU chips, multi-core GPU chips, APUs, hardware servers, laptops, portable devices, smart phones, printers, or any other suitable devices. In addition, the structure described herein may be employed in any suitable devices that employ a hardware page table walker to support address translation. Such hardware logic devices also include neuroaccelerators, microcontrollers, fixed function logic such as multi-media processors, memory management devices including, but not limited to, input/output memory management units (IOMMU), server chip sets, or any other suitable devices. The hardware page table walker 106 with region based page table prefetch in some examples is implemented in hardware circuitry and in other examples is implemented in reconfigurable hardware logic such as field programmable gate arrays. In some implementations, the hardware page table walker 106 is implemented using one or more state machines and associated hardware logic that operates as described herein. In certain implementations some or all of the functions of the hardware page table walker are implemented via a programmable microcontroller executing software instructions stored in memory.

For purposes of illustration only and not limitation, the page table walk operations will be described in connection with virtual memory regions, such as 2 MB size memory regions and smaller page tables such as 4 KB sized page tables. However, any suitable sized memory regions and subregions or frames, such as page tables may be employed as well as any suitable number of page table levels may be employed (e.g., 1 GB memory regions, 2 MB memory regions, 4 KB page tables etc.).

Figure 2:
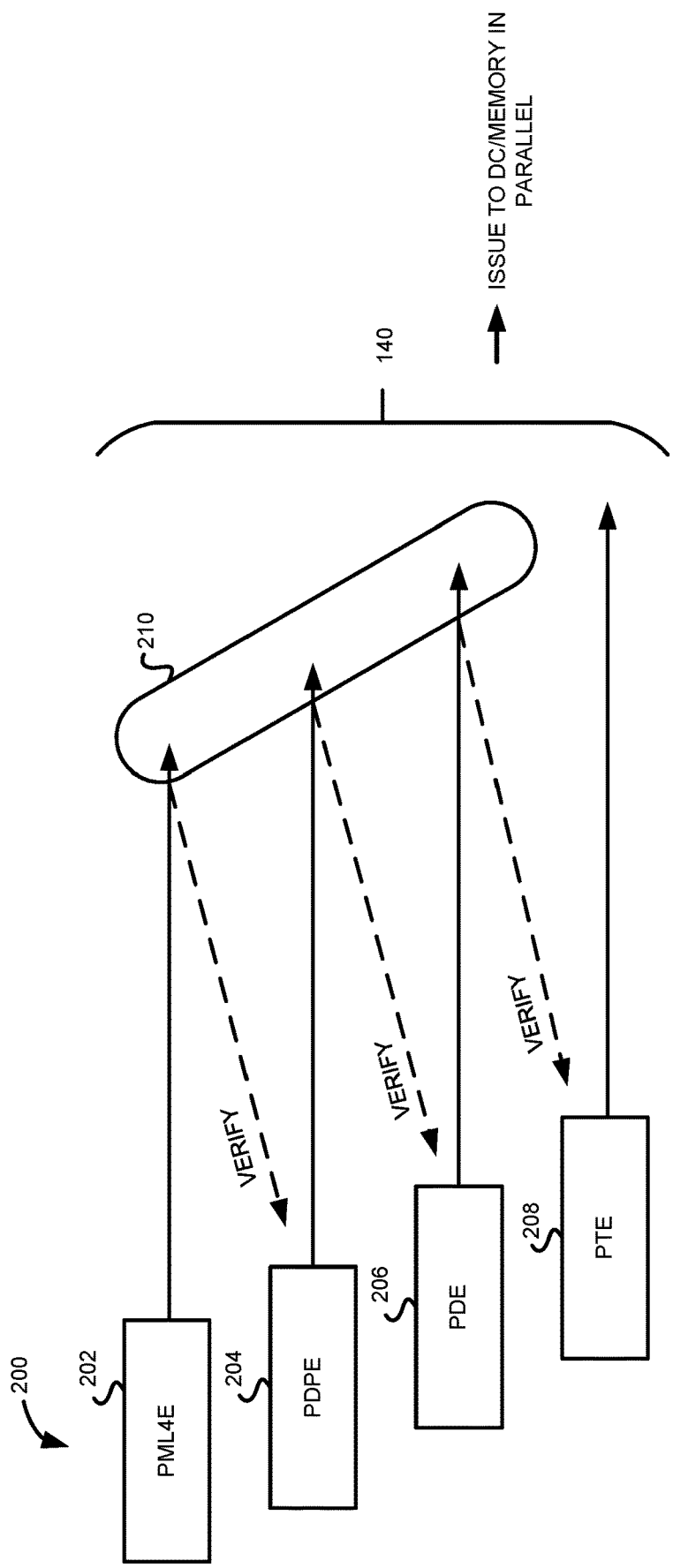
FIG. 2 is a diagram illustrating a page table walk operation that employs multiple prediction operations for multiple levels in a page walk sequence in accordance with one example set forth in the disclosure.

FIG. 2 diagrammatically illustrates a four level page table walk operation. In certain implementations, the hardware page table walker 106 employs a region-based page table prefetch and prediction mechanism for one or more of nodes (e.g., levels) in a page table walk and in one example prefetches the physical address of a PTE entry while other nodes are being handled. This allows a conversion of what was originally a serially-dependent pointer chasing page walk operation into a parallel operation as shown diagrammatically in FIG. 2.

For example, in some implementations, the hardware page table walker 106 is configured to assume that a virtual to physical memory pattern exists and that virtual 4 KB pages are aligned with virtual 2 MB regions and that consecutive virtual 4K pages are mapped to consecutive physical 4K pages with a same alignment with respect to 2 MB boundaries. A pattern is also assumed such that the PTEs that contain the mappings for all 4 KB pages in a 2 MB memory region are themselves all located in sequentially consecutive memory regions. In other examples the hardware page table walker 106 determines if one or more virtual to physical memory patterns exist.

As illustrated, a 4-level page table walk generally shown as 200 in this example has a first level 202 which obtains the address of a page directory pointer table, a second level 204 that obtains the address of a page directory, a third level 206 that obtains the address of a page table and a fourth level 208 that determines the physical address of a page table entry. When 4 KB pages are aligned within a 2 MB region, levels 202-206 are easily predictable and in some implementations, are performed in parallel as shown by block 210 by looking up prior address information in the page walk cache 130. For example, the page walk levels tend to have high hit rates in the page walk cache 130. In some implementations, the hardware page table walker 106 predicts, as shown by level 208, the physical address of a page table entry 134 in parallel with the other page table walk levels 202-206. The memory address lookups in one example are shown as lookups 140 in FIG. 1 that are issued to the data cache 114 and/or memory 108 in parallel. The dashed lines represent verification operations. For example, the first lookup based on the PML4E would normally give a physical address, for example address X, for the corresponding second level PDPE that should then be used next. The hardware page table walker 106 predicts what that PDPE physical address, for example X', and speculatively issues a request to determine what the physical address for the level after that (i.e., the PDE). If the prediction for the physical address of the PDPE is correct (i.e., X=X'), then the prediction is correct. If the prediction is wrong however (e.g., if the 4K pages are not clustered/aligned within this region), then the speculative request based on X' will be for some other PDE that does not correspond to the address that the page table walker is trying to translate. The verification is to make sure that the predicted X' actually corresponds to the actual physical address X. In certain implementations, each verification is performed as soon as the "previous" memory lookup completes. For example, when predicting the address for PTE in level 208, a verification is performed when the address from the previous lookup (corresponding to PDE in level 206) has completed and itself been verified.

In some implementations, a normal sequential walk is performed for the levels 202-206 and the hardware page table walker 106 attempts to predict and prefetch the last level 208 of the page walk, namely the lookup of the page table entry because the first several levels tend to have high hit rates in the processor's page walk cache 130 which is responsible for caching the upper levels of the page table data structure, such as everything up to but excluding the addresses for the page table entries. The hardware page table walker 106 simply requires that in some examples, the corresponding page table entries are aligned (pattern exists) unlike where a TLB coalescing technique requires that the final 4 KB physical addresses are all aligned.

Figure 5:
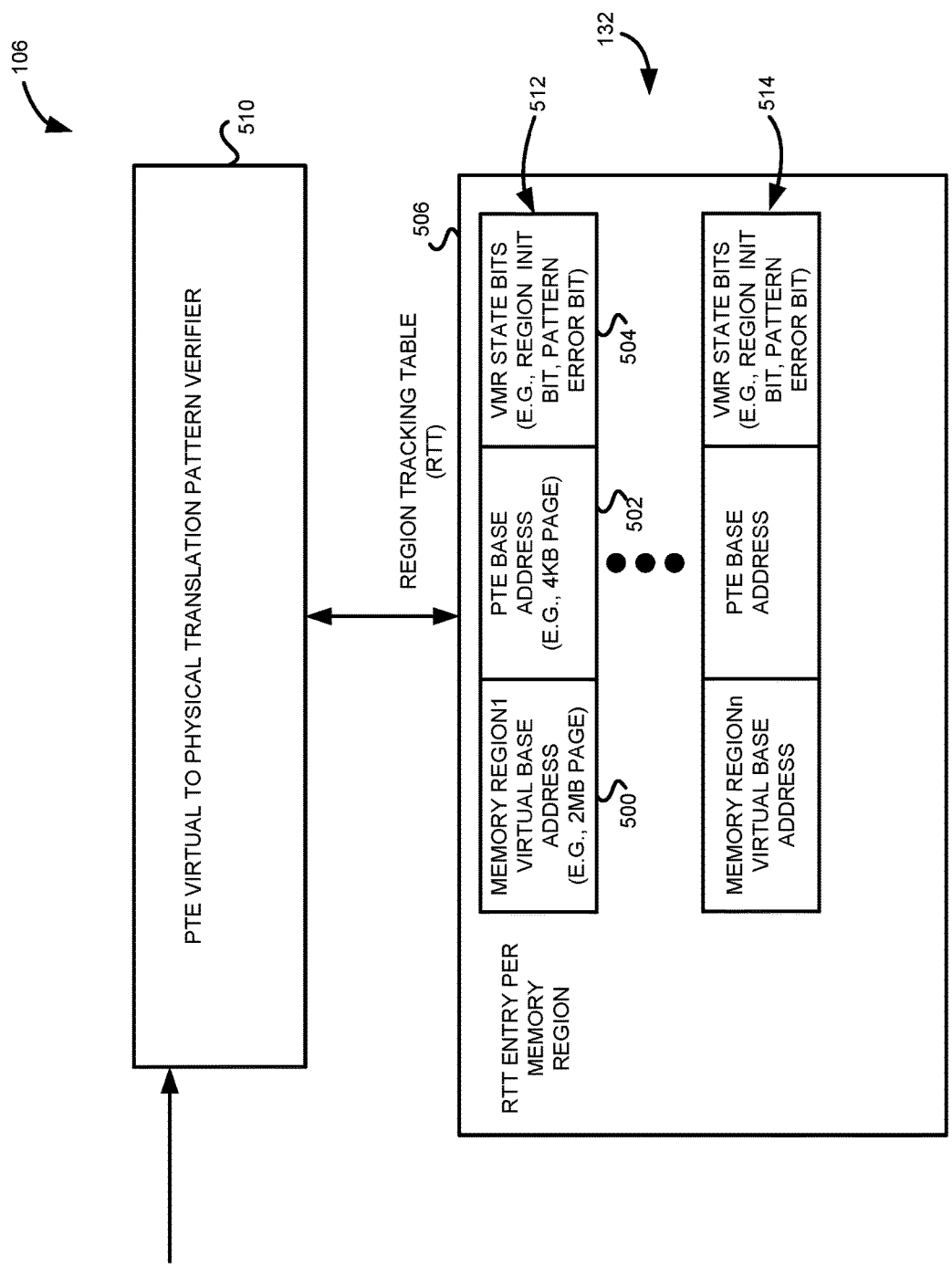
FIG. 5 is a block diagram illustrating a portion of a hardware page table walker with region based page table prefetch in accordance with one example set forth in the disclosure.

In one implementation, the hardware page table walker 106 produces the virtual memory region tracking information 132 which includes data representing a virtual base address of a virtual memory region and a physical address of a first page table entry corresponding to a virtual page within the virtual memory region (see e.g., FIG. 5). The hardware page table walker 106 prefetches a predicted physical address of a subsequent page table entry 134 that provides the final physical address for the missed TLB as the level 208 page walk.

In certain implementations, the hardware page table walker 106 produces virtual memory region tracking information that includes at least: data representing a virtual base address of a virtual memory region and a physical address of a first page table entry (PTE) corresponding to a virtual page within the virtual memory region; and prefetches a physical address of a second page table entry (PTE), that provides a final physical address for the missed TLB entry, using the virtual memory region tracking information.

In some implementations, the hardware page table walker 106 tracks prior page walk accesses of at least one virtual memory region the virtual memory region comprised of a plurality of virtual pages of memory; and predicts a physical address of a page table entry (PTE) as a last level look up in a page walk operation.

In certain implementations, the hardware page table walker 106 predicts a physical address of a page table entry (PTE) as a last level look up in a page walk operation and prefetches the physical address of the (PTE). The prefetched physical address provides a final physical address for a missed TLB entry.

Figure 3:
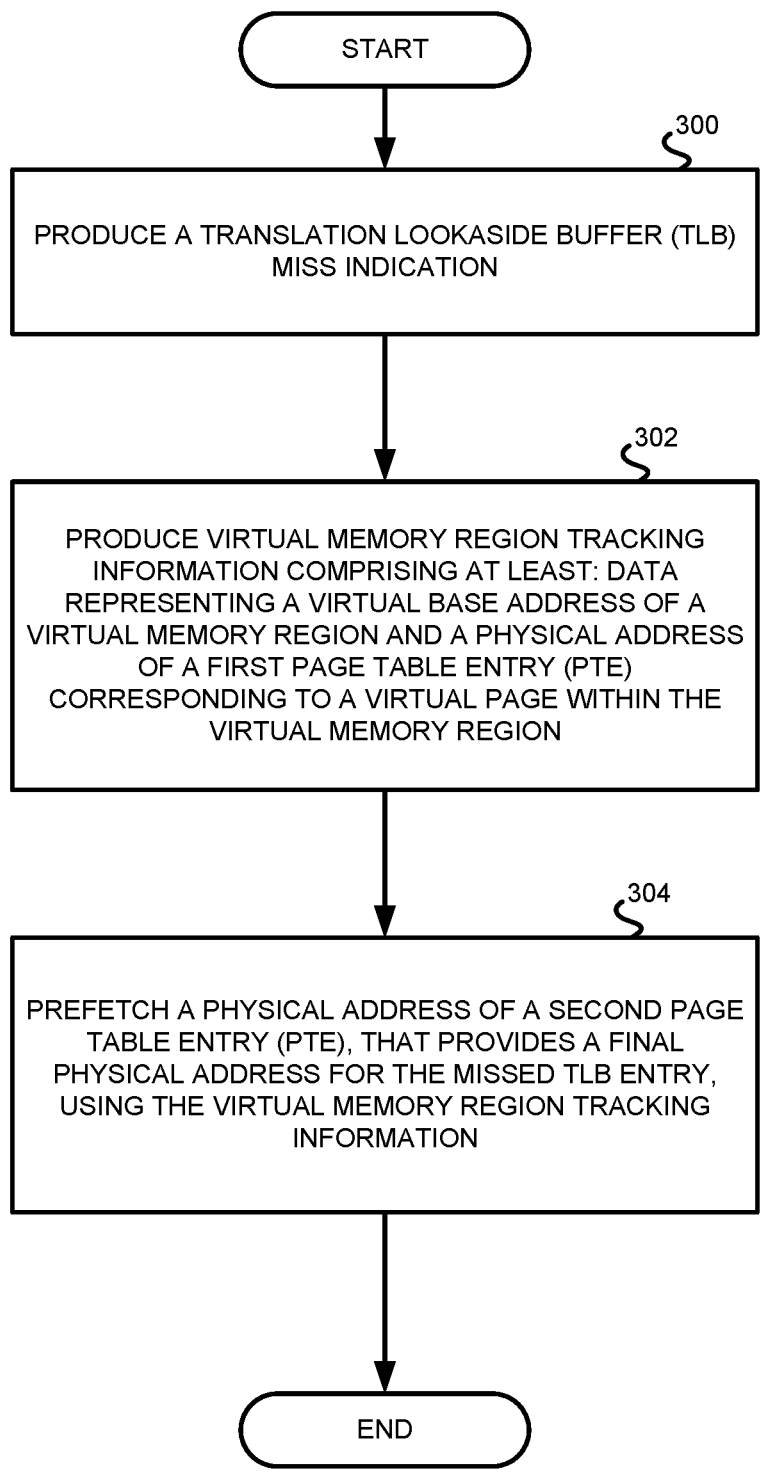
FIG. 3 is a flowchart illustrating one example of a method for providing virtual to physical address translation in accordance with one example set forth in the disclosure.
Figure 4:
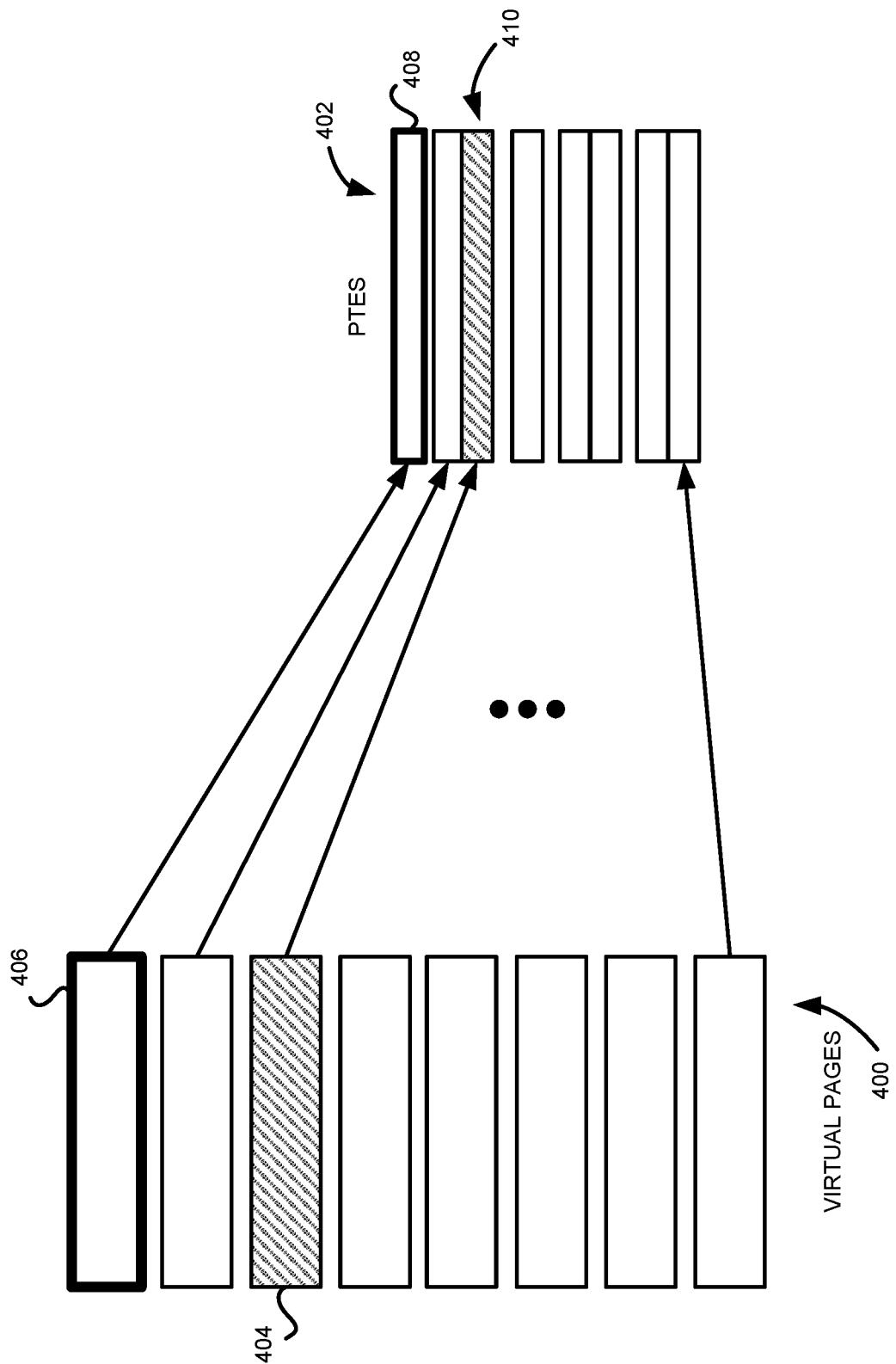
FIG. 4 is a diagram illustrating a region based page table prediction prefetch operation in accordance with one example set forth in the disclosure.

Referring also to FIGS. 3-5, the operation of the computing unit 100 of FIG. 1 will be described. FIG. 3 illustrates a method for performing virtual to physical address translation and as shown in block 300, the method includes producing a translation lookaside buffer miss indication 126. In one example, this is done by the TLB 104 in response to receiving the virtual address 118 from the processor core 102 (e.g., from an executing application). As shown in block 302, the method includes, in one example, producing, by the hardware page table walker 106, virtual memory region tracking information 132 that includes data representing a virtual base address 500 (see FIG. 5) of the virtual memory region and a physical address of a first page table entry, referred to as PTE base address 502 corresponding to a virtual page within the virtual memory region. This is done, in one example, for each virtual memory region such as a 2 MB sized memory region. As shown in block 304, the method includes prefetching, for example, by the hardware page table walker 106, a physical address of a subsequent desired page table entry, such as other than the PTE base address 502, as shown by the predicted address PTE 134 wherein the physical address of the subsequent page table entry provides a final physical address for the missed TLB entry. This is done using the virtual memory region tracking information 132 as further described below. In some implementations, the hardware page table walker 106 also produces a plurality of virtual memory region state bits 504 for each virtual memory region. In some implementations the PTE base address 502 is also predicted.

Referring to FIGS. 4 and 5, an example will be described wherein the hardware page table walker 106 produces the virtual memory region tracking information 132 by generating a region tracking table 506 that includes entries 512, 514 on a per-virtual memory region basis wherein each entry includes data representing a virtual base address 500 of the virtual memory region, the page table entry base address 502 which is a physical address of the first page table entry corresponding to a virtual page within the virtual memory region and virtual memory region state bits 504.

In one embodiment, the hardware page table walker (PTW) 106 populates a region tracking table (RTT) 506. Each entry 512-514 in the RTT 506 tracks a large memory region, for example a 2 MB page. The entry has a number of data fields: one field stores the 2 MB virtual base address 500 of the virtual memory region—this is the base address of the 2 MB region (or whatever size is used in a given implementation) being tracked by this RTT entry. Depending on the RTT organization (number of sets, set associativity), some number of bits in this base address may be omitted (e.g., the entry stores a tag rather than the full address). Another field stores the PTE base address 502. This is the physical address of the first page table entry corresponding to a virtual page with the virtual memory region. Stated another way, this is the physical address of the PTE corresponding to the first (zero offset) 4 KB page within the 2 MB virtual address region. Another field stores a plurality of virtual memory region state bits 504 per virtual memory region. For purposes of illustration only a 2-bit state will be described below. The RTT 506 is implemented in various examples as a direct-mapped, set-associative, or fully-associative set of RTT entries. All RTT entries are initially set with an invalid State of 00.

A given 2 MB virtual address maps to an RTT entry, for example, via a hash or indexing function. If there is not an RTT entry currently tracking this 2 MB virtual page (2MVP), then a new entry is allocated by the hardware page table walker 106. The entry is initialized with the virtual base address 500 (or tag) of the 2MVP, the physical address of the PTE base address 502, and the virtual memory region state bits 504 are set to 10 (in binary) to indicate that it has been initialized. Note that the physical address of the PTE base address 502 is computed based on the location of the currently requested PTE, which may or may not correspond to the first page in the 2MVP (i.e., by dropping the least few significant bits). If the 4K PTEs are aligned and sequential within this 2MVP, then this will correctly store the PTE base address.

On a subsequent page table walk for a 4 KB page, the requested 4 KB virtual page (4KVP) is used to index into the RTT 506. This is performed by first computing the physical page number for the 2MVP that contains the 4KVP of interest (this is computed by taking the requested address of the 4KVP and right shifting it by 24, which corresponds to $2^{24}$ or 2 MB), looking up in the RTT 506. If there is a hit (a matching RTT entry), then the hardware page table walker 106 predicts the physical address of the 4KVP's PTE as such:

1. PTEBA=PTE base address is taken from the matching RTT entry
2. 4K_offset=(4KVP's virtual address>>12) & 0x03FF
3. Predicted PTE address=PTEBA+4K_offset*sizeof (PTE)

As shown above, the predicted physical address of the PTE is determined using the PTE base address from an entry of a matching virtual memory region, using a virtual page table offset of aligned virtual pages in the virtual memory region and using a size of a PTE.

Referring to FIG. 4, the virtual pages 400 represent the 512 4 KB pages from an aligned 2 MB region of the virtual address space. The PTEs 402 correspond to the PTEs for each of these 4 KB pages. If the page table walker is performing a page table walk on the virtual page with offset=2, shown as virtual page 404, assuming the first page 406 has an offset=0. The PTEBA (Step 1) is the address corresponding to the first 4KVP (the 4 KB page 406). After computing the calculation in Step 2, the result is a 4K_offset=2. The RTT 506 provides the PTE base address (PTEBA) of this region, which corresponds to the first PTE entry 408. For Step 3 the (4K_offset) times the size of the PTE is performed and adding that to the PTEBA produces the predicted physical address of the desired PTE 410. This works so long as the accessed PTEs within the region are aligned. The term access is used because even if some PTEs are not aligned, so long as the program does not access such unaligned pages, PTE prediction for other remaining accessed and aligned pages will remain accurate.

Utilizing the predicted physical address of the PTE 410, the hardware page table walker 106 issues a memory lookup (e.g., a request to the CPU data cache 114) for the PTE in parallel with the earlier levels of the page table walk. As such the hardware page table walker 106 performs the prefetch of the physical address of the page table entry 134 that provides the final physical address in parallel with previous page walk operations of a multi-level page walk operation. When the earlier levels of the page table walk complete, that process will provide the correct address of the requested PTE. If they match, then the original speculation was correct. When the PTE lookup request to memory completes (if it has not already), then the final virtual-to-physical address translation can be provided from the PTE's data in normal fashion. If they do not match, the hardware page table walker 106 determines a misspeculation occurred and a new request for the correct PTE address must be issued. In such a case, the hardware page table walker 106 may have wasted some of the cache/memory bandwidth to lookup a PTE that is not needed.

When a misspeculation occurs, to prevent subsequent misspeculations, the RTT entry's state bit is set to 11 (again in binary). This indicates that the RTT entry is tracking this 2MVP, but the hardware page table walker 106 has discovered that the corresponding 4 KB pages within the 2MVP do not have contiguously laid out PTEs and no further PTE predictions and prefetches should be made for this 2MVP. As such, the hardware page walker 106 determines whether the prefetch was based on a misprediction of the physical address of the PTE. In one example this can be determined by completing a sequential walking of the levels and comparing the resulting PTE physical address with the prefetched physical PTE address and if a match occurs then the prediction was good and the 2MVP memory can be used for further PTE address prediction.

The hardware page table walker 106 controls the plurality of virtual memory region state bits 504 to indicate one or more of the following states: (a) that the virtual pages within the virtual memory region do not follow a desired physical memory address pattern; (b) that the virtual pages within the virtual memory region do follow a desired physical memory address pattern; (c) whether to use the virtual memory region in subsequent page table walks to predict the physical PTE addresses of virtual pages; and (d) a number of times that a desired physical memory address pattern for the virtual pages in a given virtual memory region has been detected.

In one example, the hardware page table walker 106 includes a page table entry virtual to physical translation pattern verifier 510 that, in one example, is preconfigured or programmed to assume a pattern already exists. For example, once a 2MVP is seen and recorded in the RTT 506, the virtual memory region can immediately be used to predict PTE addresses for any subsequent 4KVP page table walks within that 2MVP region. In another embodiment, the pattern verifier 510 determines whether a pattern exists between the page table entries between virtual page tables and physical page table entries exists before enabling predictions and prefetching of PTE addresses. In this embodiment when the RTT entry is initialized after first accessing the 2MVP, the RTT entry state is first set to 01. If a subsequent access to the same 2MVP results in a consistent PTE (i.e., still aligned) address, then the state is set to 10, at which point any further page table walks can use the RTT entry information to prefetch. State 01 effectively indicates that the hardware page table walker 106 only saw a single 4KVP and therefore has no evidence as to whether other 4KVPs within this 2MVP are aligned. State 10 indicates that the hardware page table walker 106 has tracked at least two 4KVP lookups that were aligned, and therefore starts predicting/prefetching. The hardware page table walker 106 in one example does not track which specific 4KVP was last accessed. In other example such tracking is done. In some implementations, rather than keeping a 2-bit state per RTT entry, the hardware page table walker 106 uses an n-bit state, with state 00 being invalid, state 11 . . . 111 being "tracked but not aligned", and then the remaining states in between used to track k different states indicating "the PTW has seen k aligned accesses", and one state indicating "the PTW has seen k or more aligned accesses, go ahead and predict/prefetch". Depending on the values of n and k, this provides tradeoffs in how aggressively the page table walker attempts to predict and prefetch PTE entries. If at any point an unaligned PTE is accessed, the state is set to 11 . . . 111.

At some point, the RTT may become full and unable to track any new 2MVPs without evicting/invalidating an existing RTT entry. Any number of replacement policies may be utilized. For example, LRU, RRIP, or similar could be utilized. In some embodiments, the replacement policy should prioritize RTT entries with a State of 11 (or 11 . . . 111 in the general case of an n-bit State), as these are RTT entries that are guaranteed to not provide useful predictions/prefetches. One such example replacement algorithms first considers only RTT entries with a State of 11, and it selects the least-recently used (LRU) among those. If no RTT entries exist with a State of 11, then it selects the LRU entry of the remaining RTT entries.

As noted above, in certain implementations the disclosed hardware page walker attempts to predict the address of the page table entry that provides the final physical address but does not require coordination between hardware mechanisms and operating system support. In some examples, the hardware page walker uses patterns in PTE address mappings and does not predict the final translated physical address. The hardware page table walker leverages the "clustering" of PTEs in physical memory to enable effective prediction of the address of a PTE entry. This prediction is used to prefetch the PTE entry into the processor's cache hierarchy and/or TLB(s). In some implementations, the hardware page table walker predicts one or more of the nodes in the page table walk and then prefetches those addresses for those nodes. This allows a conversion of what was originally a serially-dependent "pointer chasing" page walk operation into a parallel one as shown above.

As also set forth above, the translation lookaside buffer (TLB) produces a TLB miss indication, and in response to the TLB miss, the hardware page table walker tracks prior page walk accesses of at least one virtual memory region the virtual memory region and performs a prediction and prefetch of a physical address of a page table entry (PTE) as a last level look up in a page walk operation in parallel with earlier page table walk operations. The parallel prediction and prefetch of the physical address of the PTE is based on the tracked prior page walk accesses of the at least one virtual memory region, tracked for example by the pattern verifier.

The hardware page table walker tracks prior page walk accesses of the at least one virtual memory region by producing virtual memory region tracking information by generating a region tracking table (RTT) that includes entries on a per virtual memory region basis wherein each entry includes data representing at least the virtual base address of the virtual memory region, the physical address of the first page table entry (PTE) corresponding to a virtual page within the virtual memory region, and a plurality of virtual memory region state bits per memory region. The hardware page walker 106 controls the plurality of virtual memory region state bits to indicate at least one of the following states: that the virtual pages within the virtual memory region do not follow a desired physical memory address pattern, that the virtual pages within the virtual memory region do follow a desired physical memory address pattern, whether to use the virtual memory region in subsequent page table walks to predict the physical PTE addresses of virtual pages and a number of times that a desired physical memory address pattern for the virtual pages in a given virtual memory region has been detected.

Figure 6:
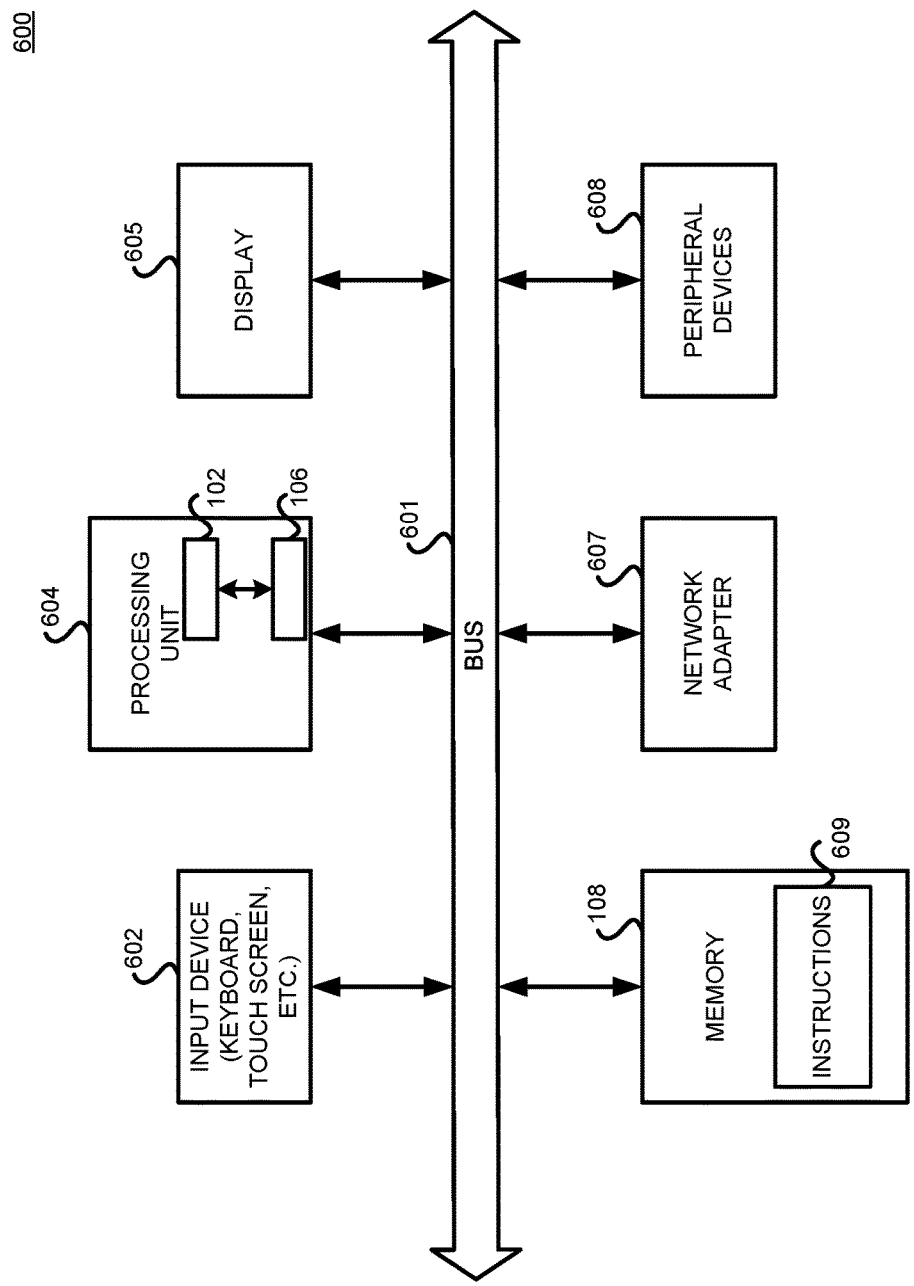
FIG. 6 is a block diagram illustrating a computing device that employs a hardware page table walker with region based page table prefetch in accordance with one example set forth in the disclosure.

FIG. 6 illustrates an embodiment of a computing system 600 that uses the hardware page table walker 106 and associated blocks in FIG. 1. In general, the computing system 600 is embodied as any of a number of different types of devices, including but not limited to a laptop or desktop computer, mobile device, web server, network switch or router, system on chip, integrated circuit, multi-package device etc. In this example, the computing system 600 includes a number of components 602-608 that communicate with each other through a bus 601. In computing system 600, each of the components 602-608 is capable of communicating with any of the other components 602-608 either directly through the bus 601, or via one or more of the other components 602-608. The components 602-608 in computing system 600 are contained within a single physical enclosure, such as a laptop or desktop chassis, or a mobile phone casing or in some implementations are a system on-chip or other configuration. In alternative embodiments, some of the components of computing system 600 are embodied as peripheral devices such that the entire computing system 600 does not reside within a single physical enclosure.

In some implementations, the computing system 600 also includes user interface devices for receiving information from or providing information to a user. Specifically, the computing system 600 includes an input device 602, such as a keyboard, mouse, touch-screen, or other device for receiving information from the user. The computing system 600 displays information to the user via a display 605, such as a monitor, light-emitting diode (LED) display, liquid crystal display, or other output device. However, such devices need not be employed.

In certain implementations, computing system 600 additionally includes a network adapter 607 for transmitting and receiving data over a wired or wireless network. Computing system 600 also includes one or more peripheral devices 608. The peripheral devices 608 may include mass storage devices, location detection devices, sensors, input devices, or other types of devices used by the computing system 600.

Computing system 600 includes a processing unit 604. The processing unit 604 receives and executes instructions 609 that are stored in a memory system 606. In one embodiment, the processing unit 604 includes multiple processing cores 102 that reside on a common integrated circuit substrate. Memory system 606 includes memory devices used by the computing system 600, such as random-access memory (RAM) modules, read-only memory (ROM) modules, hard disks, and other non-transitory computer-readable media. Some of the memory devices are used as memory 108 for the processing unit 604.

Some embodiments of computing system 600 may include fewer or more components than the embodiment as illustrated in FIG. 6. For example, certain embodiments are implemented without any display 605 or input devices 602. Other embodiments have more than one of a particular component, for example, an embodiment of computing system 600 could have multiple processing units 604, buses 601, network adapters 607, memory systems 606, etc.

Although features and elements are described above in particular combinations, each feature or element can be used alone without the other features and elements or in various combinations with or without other features and elements. The apparatus described herein in some implementations are manufactured by using a computer program, software, or firmware incorporated in a non-transitory computer-readable storage medium for execution by a general-purpose computer or a processor. Examples of computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

In the preceding detailed description of the various embodiments, reference has been made to the accompanying drawings which form a part thereof, and in which is shown by way of illustration specific preferred embodiments in which the invention may be practiced. These embodiments are described in sufficient detail to enable those skilled in the art to practice the invention, and it is to be understood that other embodiments may be utilized, and that logical, mechanical and electrical changes may be made without departing from the scope of the invention. To avoid detail not necessary to enable those skilled in the art to practice the invention, the description may omit certain information known to those skilled in the art. Furthermore, many other varied embodiments that incorporate the teachings of the disclosure may be easily constructed by those skilled in the art. Accordingly, the present invention is not intended to be limited to the specific form set forth herein, but on the contrary, it is intended to cover such alternatives, modifications, and equivalents, as can be reasonably included within the scope of the invention. The preceding detailed description is, therefore, not to be taken in a limiting sense, and the scope of the present invention is defined only by the appended claims. The above detailed description of the embodiments and the examples described therein have been presented for the purposes of illustration and description only and not by limitation. For example, the operations described are done in any suitable order or manner. It is therefore contemplated that the present invention covers any and all modifications, variations or equivalents that fall within the scope of the basic underlying principles disclosed above and claimed herein.

The above detailed description and the examples described therein have been presented for the purposes of illustration and description only and not for limitation.

What is claimed is:

1. An apparatus for providing virtual to physical address translation comprising:
 a hardware page table walker operative to:
  produce virtual memory region tracking information by generating the virtual memory region tracking information on a per virtual memory region basis, comprising at least: data representing a virtual base address of a virtual memory region and a physical address of a first page table entry (PTE) corresponding to a virtual page within the virtual memory region; and
  prefetch a physical address of a second page table entry (PTE), that provides a final physical address for a missed translation lookaside buffer (TLB) entry, using the virtual memory region tracking information.

2. The apparatus of claim 1 wherein the hardware page table walker is operative to produce the virtual memory region tracking information by generating a region tracking table (RTT) comprising entries on a per virtual memory region basis wherein each entry comprises data representing at least:
 the virtual base address of the virtual memory region;
 the physical address of the first page table entry (PTE) corresponding to a virtual page within the virtual memory region; and
 a plurality of virtual memory region state bits per memory region.

3. The apparatus of claim 2 wherein the hardware page walker is operative to control the plurality of virtual memory region state bits to indicate at least one of the following states:
 (a) that the virtual pages within the virtual memory region do not follow a desired physical memory address pattern;
 (b) that the virtual pages within the virtual memory region do follow a desired physical memory address pattern;
 (c) whether to use the virtual memory region in subsequent page table walks to predict the physical PTE addresses of virtual pages; and
 (d) a number of times that a desired physical memory address pattern for the virtual pages in a given virtual memory region has been detected.

4. The apparatus of claim 2 wherein the hardware page walker is operative to prefetch the physical address of the second PTE by determining a predicted physical address of the second PTE using the PTE base address from an entry of a matching virtual memory region, using a virtual page table offset of aligned virtual pages in the virtual memory region and using a size of a PTE.

5. The apparatus of claim 1 wherein the hardware logic comprises PTE address pattern determination logic operative to determine that virtual pages within the virtual memory region do not follow a desired physical memory address pattern.

6. The apparatus of claim 1 wherein the hardware page table walker is operative to provide the prefetched physical address of the second page table entry to at least one of the TLB or a data cache.

7. The apparatus of claim 1 wherein the hardware page table walker is operative to perform the parallel prefetch of the physical address of the second page table entry as a last level in a page walk operation based on the virtual memory region tracking information.

8. The apparatus of claim 1 comprising at least one processing core operative to request data using one or more virtual addresses and memory operatively coupled to the TLB and to the hardware page table walker that stores page tables comprising page table entries.

9. An apparatus for providing virtual to physical address translation comprising:
 a hardware page table walker operative to:
  track prior page walk accesses of at least one virtual memory region the virtual memory region comprised of a plurality of virtual pages of memory by generating the virtual memory region tracking information on a per virtual memory region basis; and
  predict a physical address of a page table entry (PTE) as a last level look up in a page walk operation based on the virtual memory region tracking information.

10. The apparatus of claim 9 wherein the predication is performed in parallel with earlier page table walk operations, and wherein the parallel prediction of the physical address of the PTE is based on the tracked prior page walk accesses of the at least one virtual memory region.

11. The apparatus of claim 9 wherein the hardware page table walker is operative to track prior page walk accesses of the at least one virtual memory region by producing the virtual memory region tracking information by generating a region tracking table (RTT) comprising entries on a per virtual memory region basis wherein each entry comprises data representing at least:
   the virtual base address of the virtual memory region;
   the physical address of the first page table entry (PTE) corresponding to a virtual page within the virtual memory region; and
   a plurality of virtual memory region state bits per memory region.

12. The apparatus of claim 11 wherein the hardware page walker is operative to control the plurality of virtual memory region state bits to indicate at least one of the following states:
   (a) that the virtual pages within the virtual memory region do not follow a desired physical memory address pattern;
   (b) that the virtual pages within the virtual memory region do follow a desired physical memory address pattern;
   (c) whether to use the virtual memory region in subsequent page table walks to predict the physical PTE addresses of virtual pages; and
   (d) a number of times that a desired physical memory address pattern for the virtual pages in a given virtual memory region has been detected.

13. An apparatus for providing virtual to physical address translation comprising:
   a hardware page table walker operative to:
      predict a physical address of a page table entry (PTE) as a last level look up in a page walk operation by generating the virtual memory region tracking information on a per virtual memory region basis; and
      prefetch the physical address of the (PTE), wherein the prefetched physical address provides a final physical address for a missed TLB entry.

14. The apparatus of claim 13 wherein the hardware page table walker is operative to track prior page walk accesses of at least one virtual memory region the virtual memory region comprised of a plurality of virtual pages of memory.

15. The apparatus of claim 13 wherein the hardware page table walker is operative to produce the virtual memory region tracking information comprising at least: data representing a virtual base address of a virtual memory region and a physical address of a first page table entry (PTE) corresponding to a virtual page within the virtual memory region.

16. The apparatus of claim 15 wherein the hardware page table walker is operative to produce the virtual memory region tracking information by generating a region tracking table (RTT) comprising entries on a per virtual memory region basis wherein each entry comprises data representing at least:
   the virtual base address of the virtual memory region;
   the physical address of the first page table entry (PTE) corresponding to a virtual page within the virtual memory region; and
   a plurality of virtual memory region state bits per memory region.

17. The apparatus of claim 16 wherein the hardware page walker is operative to control the plurality of virtual memory region state bits to indicate at least one of the following states:
   (e) that the virtual pages within the virtual memory region do not follow a desired physical memory address pattern;
   that the virtual pages within the virtual memory region do follow a desired physical memory address pattern;
   (g) whether to use the virtual memory region in subsequent page table walks to predict the physical PTE addresses of virtual pages; and
   (h) a number of times that a desired physical memory address pattern for the virtual pages in a given virtual memory region has been detected.

18. The apparatus of claim 15 wherein the hardware page walker is operative to prefetch the physical address of the second PTE by determining a predicted physical address of the second PTE using the PTE base address from an entry of a matching virtual memory region, using a virtual page table offset of aligned virtual pages in the virtual memory region and using a size of a PTE.

19. The apparatus of claim 15 wherein the hardware logic comprises PTE address pattern determination logic operative to determine that virtual pages within the virtual memory region do not follow a desired physical memory address pattern.

20. The apparatus of claim 15 wherein the hardware page table walker is operative to perform a parallel prefetch of the physical address of the page table entry as a last level in a page walk operation based on the virtual memory region tracking information.

* * * * *